(12) United States Patent
Bowerman et al.

(10) Patent No.: US 6,382,047 B2
(45) Date of Patent: May 7, 2002

(54) TILT LEVER FOR ADJUSTABLE STEERING COLUMNS

(75) Inventors: Brian C. Bowerman, Quincy; Duane Kubasiak, Bronson, both of MI (US)

(73) Assignee: Douglas Autotech Corporation, Bronson, MI (US)

( * ) Notice: Subject to any disclaimer, the term of this patent is extended or adjusted under 35 U.S.C. 154(b) by 0 days.

(21) Appl. No.: 09/843,978

(22) Filed: Apr. 27, 2001

Related U.S. Application Data

(60) Provisional application No. 60/200,182, filed on Apr. 27, 2000.

(51) Int. Cl.[7] .................................................. B62D 1/18
(52) U.S. Cl. .............................. 74/493; 74/531; 280/775
(58) Field of Search ..................... 74/493, 531; 280/775

(56) References Cited

U.S. PATENT DOCUMENTS 3,487,712 A * 1/1970 Steiner ........................ 74/493
4,507,982 A * 4/1985 Turner et al. ................. 74/493

* cited by examiner

*Primary Examiner*—Allan D. Herrmann
(74) *Attorney, Agent, or Firm*—Barry C. Kane; Miller Johnson Snell & Cummiskey, PLC

(57) ABSTRACT

An lever assembly for an adjustable steering column, comprising a bracket assembly extending from the adjustable steering column, the bracket having a first and a second bracket arms, a lever arm having an intermediate portion pivotally coupled between the first and second bracket arms such that opposite ends of the lever arm are movable between a first and a second positions; and a lever pin extending from one of the first and second bracket arms and biased into frictional engagement with the lever arm when one of the ends is in said first position. An adjustment member is provided adjacent the biasing member for adjusting the biasing force of the lever pin against the lever arm.

14 Claims, 3 Drawing Sheets

TILT LEVER FOR ADJUSTABLE STEERING COLUMNS

This application claims the benefit of provisional application No. 60/200,182 filed Apr. 27, 2000.

BACKGROUND OF THE INVENTION

1. Field of the Invention

The instant invention relates generally to actuator levers, particularly mechanisms for adjusting vehicle steering columns, and more particularly to a mechanism which temporarily maintains a lever in a first or open position so an operator can use two hands to complete adjustment of a tilting and/or telescoping steering column.

2. Brief Description of the Related Art

Traditionally, actuator levers used to adjust steering columns were biased by a spring mechanism such that the operator pulled or pushed on the lever to change the relative position of the steering column and then released the lever to lock the position of the column. A problem sometimes associated with biased lever assemblies is the operator may require the use of both hands in positioning the column. In the case of the biased levers, when the lever was released, the column was fixed in position and the operator was unable to complete the repositioning without maintaining one hand on the lever and the other hand on the steering column or wheel. A major disadvantage with the prior positioning systems is that adjustment of the steering column position was not possible when the hand was removed from the lever as they were all spring biased to lock when the pressure was released. It is an object of this invention to provide a lever assembly which is temporarily held in position to enable two handed movement of the steering column.

SUMMARY OF THE INVENTION

It is the purpose of the instant invention to provide an adjustable lever assembly which permits the operator to use both hands to reconfigure the position of the column before locking the column in position.

Accordingly to one embodiment of the invention, a lever assembly for an adjustable steering column is provided which is comprised of a bracket assembly extending from the adjustable steering column, the bracket having a first and a second bracket arms. A lever arm is also provided having an intermediate portion pivotally coupled between the first and the second bracket arms such that opposite ends of the lever arm are movable between a first and a second positions. The lever arm is temporarily retained in the first position by a lever pin extending from one of the first and second bracket arms and biased into frictional engagement with the lever arm such that the operator can utilize two hands in placing the steering column in the desired position. In a preferred embodiment, the lever pin extending from one of the first and second bracket arms is retained within a passage and urged in an extending position by a biasing member such as a spring. To facilitate easy engagement between the lever arm and the lever pin, the upper end of the lever pin is tapered or rounded to provide a bearing surface against the lever arm.

The instant invention helps the operator position the steering column by allowing the operator to use two hands in the operation. Prior devices always required the operator to keep one hand on the lever to keep the lever open, while other hand was used to position the column. Where dexterity or strength of the operator makes it difficult to carry out such an operation using a singular hand, the instant invention permits the operator to get good grip on the steering column and place it in the most appropriate position. When positioning is accomplished, the operator need only tap the lever arm to release it from the first position and lock the position of the steering column.

These and other advantages of the steering column will become readily apparent once the reader refers to the detailed description of the invention below when taken in reference to the appended drawing figures.

DETAILED DESCRIPTION OF ONE EMBODIMENT OF THE INVENTION

Figure 1:
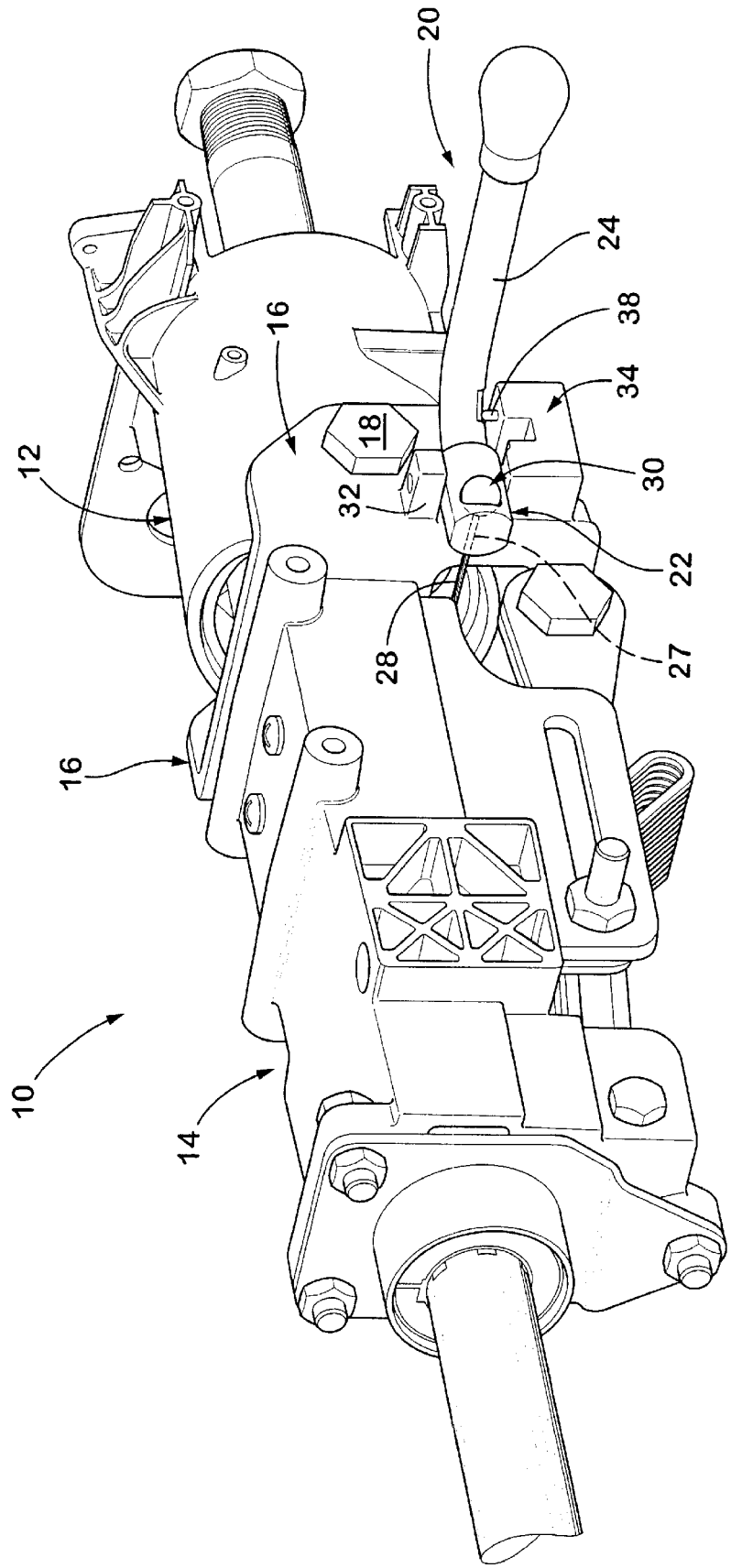
FIG. 1 is a fragmentary oblique view of an adjustable steering column illustrating an adjustment lever in a locked position.

For purposes of the following description, the terms "upper," "lower," "left," "rear," "front," "vertical," "horizontal" and derivatives of such terms shall relate to the invention as oriented in FIG. 1. However, it is to be understood the invention may assume various alternative orientations, except where expressly specified to the contrary. It should also to be understood the specific devices and processes illustrated in the attached drawings, and described in the following specification, are simply exemplary embodiments of the inventive concepts defined in the appended claims. Specific dimensions and other physical characteristics relating to the embodiments disclosed herein are not to be considered limiting, unless the claims expressly state otherwise.

Figure 2:
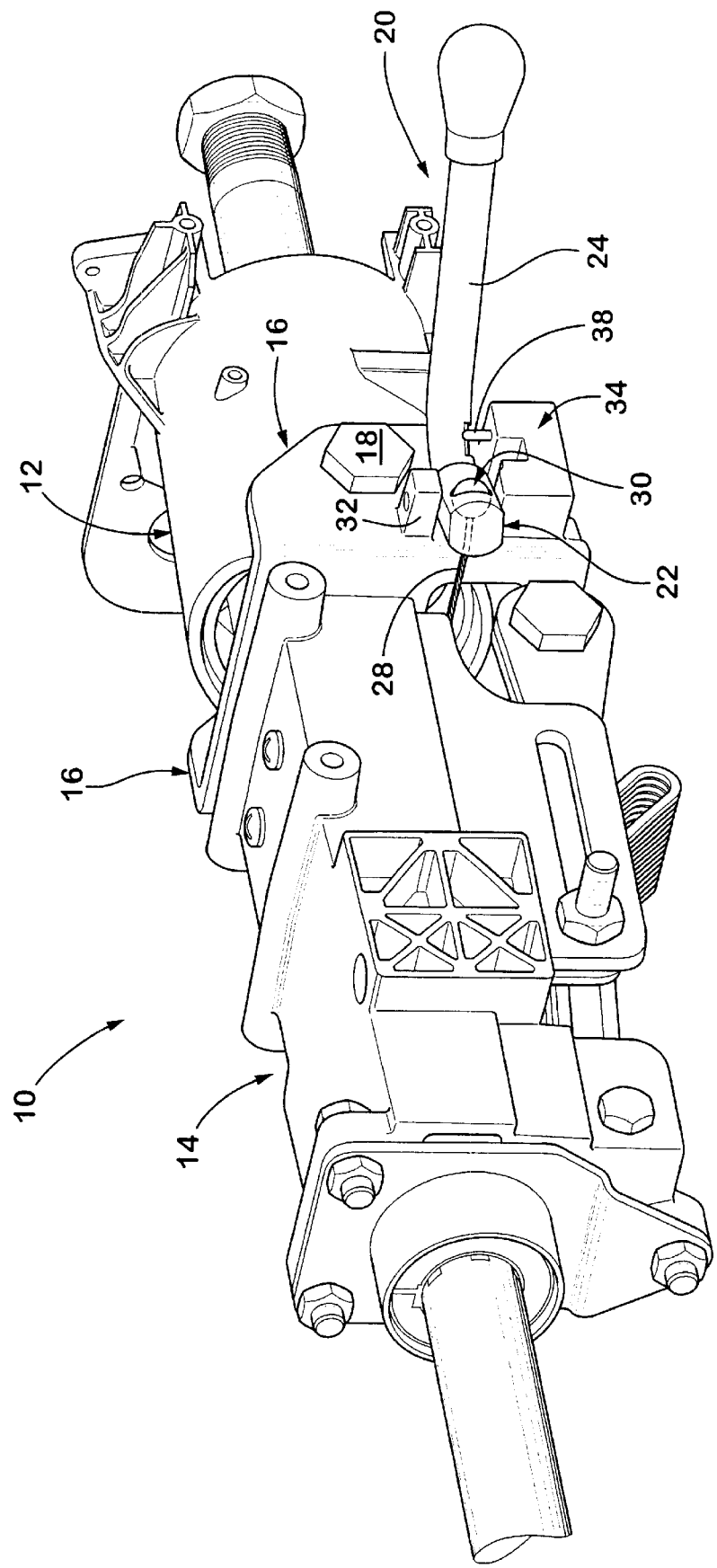
FIG. 2 is a fragmentary oblique view of an adjustable steering column illustrating the adjusting lever in the open position.
Figure 3:
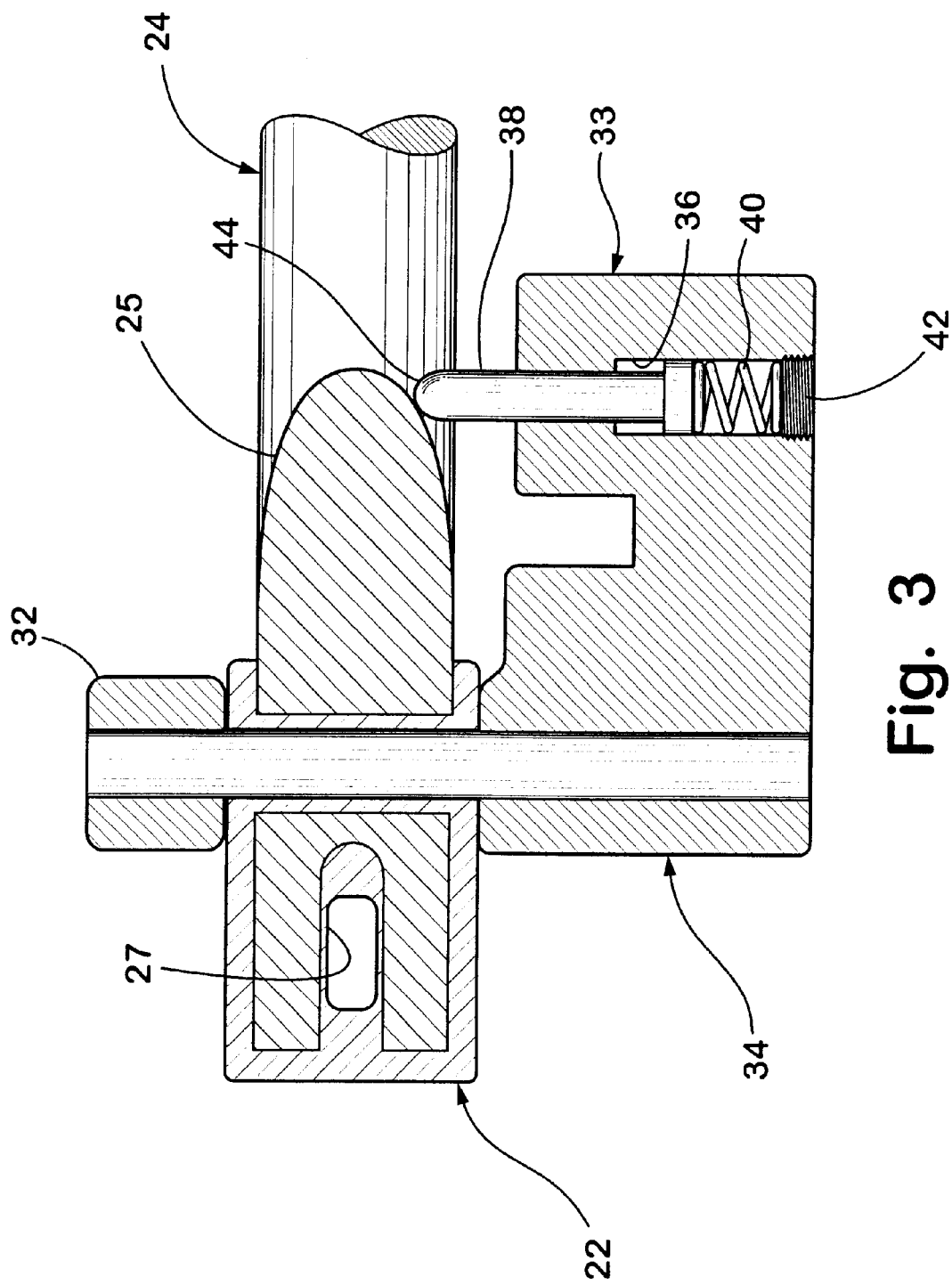
FIG. 3 is a fragmentary cross section view of a portion of the adjusting lever.

Referring to FIGS. 1 through 3, an adjustable steering column 10 is shown, including an upper housing 12 pivotally coupled to a lower housing 14 between flanges 16. In the embodiment shown, bolts 18 pass through flanges 16 into the upper housing 12 and provide a substantially horizontal pivot axis about which the upper column 12 tilts. In addition, flanges 16 may be coupled to a shuttle (not shown) slidably disposed within the lower housing 14 to permit telescopic movement of a steering column assembly 10.

Although not shown in detail in FIGS. 1 through 3, the tilt of upper housing 12 and the telescopic movement of the shuttle with respect to the lower housing 14 may be controlled by a locking mechanism which is opened and closed by a lever such as lever assembly 20 pivotally coupled proximate end 22 to a bracket assembly extending from the flange 16. The lever arm 24 may assume one of a variety of shapes so long as the lever arm 24 extends generally perpendicularly away from the steering column assembly 10. The shorter portion of the arm 25 of the lever 24 (to the left of the pivot shown in FIG. 1) includes a transverse passage 27 which receives a cable 28 held in place by a termination 30. The lever arm 24 is pivotally coupled to the bracket assembly defined by an upper bracket 32 and a lower bracket 34, both extending from the exterior surface of flange 16. The lower bracket 34 is slightly larger than bracket 32 and includes a portion 33 which is positioned proximate the bend of the lever arm 24, Extending vertically through the extension portion 33 of the lower bracket 34 is a passage 36 adapted to receive a lever pin 38 such that the lever pin 38 extends through the upper portion of the passage 36. Located at the lower end of the lever pin 38 is a spring 40 adapted to engage the lower end of the pin 38, and at an opposite end to engage a set screw 42 which is threadably received within the passage 36. To keep the pin 38 within the passage 36, the passage 36 may have a shoulder adapted to engage a shoulder on the lever pin to limit the upward travel. In this configuration, the upper end 44 of the pin 38 may be radiused and adapted to engage the lower surface of the lever arm 24 and frictionally engage the lever arm 24 to hold it in position when the lever arm 24 is pulled toward the operator. The force of the spring 40 on the lower end of the lever pin 38 urges the radius end 44 against the lower surface of the lever arm 24 with sufficient frictional force to retain the lever arm 24 in position. This permits the operator to remove their hand from the lever arm 24 and use both hands to adjust the position of the steering column. Once the steering column is in the desired position, the operator simply pushes the lever arm 24 in the opposite direction to overcome the frictional engagement between the radius end 44 and the lever arm 24.

Although drawing FIGS. 1 through 3 illustrate the lower bracket or block 34 as a single unit, it is contemplated the pivot for the lever arm 24 may be achieved by brackets, separate and apart, from the block used to retain the lever pin 38. Additionally, it is contemplated the actual shape of the lever pin 38 may vary in terms of diameter and compression distance in order to achieve the particular frictional contact with the lower surface of the lever arm 24. Furthermore, it is contemplated the frictional engagement between the pin 38 and lever arm 24 may occur on the upper surface of the lever arm 24, rather than the lower surface to fix the lever arm 24 in position until adjustment of the steering column is complete.

The above description is considered that of the preferred embodiment only. Modifications of the invention will occur to those skilled in the art and to those who make or use the invention. Therefore, it is understood that the embodiment shown in these drawings and described herein are merely for illustrative purposes and not intended to limit the scope of the invention, which is defined by the claims in this or any subsequent or related application, and interpreted according to the principals of patent law, including the doctrine of equivalents.

What is claimed is:

1. A tilt lever assembly for an adjustable steering column having an upper housing movable relative to an interconnected lower housing, comprising in combination:
    a lever arm pivotally coupled proximate one end to a bracket assembly extending from one of the upper housing and the lower housing and adapted to move between a first and second positions; and
    a lever pin extending from said bracket assembly and adapted to frictionally engage a portion of said lever arm and retain said lever arm when said lever arm is in said first position.

2. The tilt lever assembly as defined in claim 1, further comprising a member for biasing said lever pin into frictional engagement with said lever arm.

3. The tilt lever assembly as defined in claim 2, wherein said member for biasing said lever pin is adjustable.

4. The tilt lever assembly as defined in claim 3, wherein said lever pin includes a shoulder for retaining said lever pin within said bracket assembly.

5. The tilt lever assembly as defined in claim 4, wherein an end of said lever pin adapted to frictionally engage a portion of said lever arm includes a taper.

6. A lever assembly, comprising in combination:
    a bracket;
    a lever arm having an intermediate portion pivotally coupled to said bracket such that said lever arm is movable between a first and second positions; and
    a member extending from said bracket and adapted to frictionally engage a portion of said lever arm when said lever arm is in said first position and hold said lever arm in said first position.

7. The lever assembly as defined in claim 6, further comprising a biasing member disposed between said bracket and said member for urging said member into frictional engagement with said lever arm.

8. The lever assembly as defined in claim 7, further comprising a passage defined within said bracket for retaining said member therein.

9. The lever assembly as defined in claim 8, further comprising an adjustment screw engaging said biasing member for adjusting a force exerted by said biasing member against said member.

10. The lever assembly as defined in claim 9, further wherein said member retained within said passage and extending from said bracket includes a pin having a tapered first end, and a shoulder at a second end for retaining said pin within said passage.

11. An lever assembly for an adjustable steering column, comprising in combination:
    a bracket assembly extending from the adjustable steering column, said bracket having a first and a second bracket arms;
    a lever arm having an intermediate portion pivotally coupled between said first and second bracket arms such that opposite ends of said lever arm are movable between a first and a second positions; and
    a lever pin extending from one of said first and second bracket arms and biased into frictional engagement with said lever arm when one of said ends is in said first position.

12. The lever assembly as defined in claim 11, further comprising a member for adjusting a biasing force of said lever pin into engagement with said lever arm.

13. The lever assembly as defined in claim 12, wherein said lever pin extends from a passage defined in one of said first and second bracket arms.

14. The lever assembly as defined in claim 13, wherein said lever pin includes a taper at a first end, and a shoulder at a second end for retaining said lever pin within said passage.

* * * * *